July 17, 1956 — R. W. FULLER ET AL — 2,754,632
PRESSURE-OPERATED CONTROL FOR CENTERLESS GRINDING MACHINES
Filed Nov 30, 1954 — 6 Sheets-Sheet 1

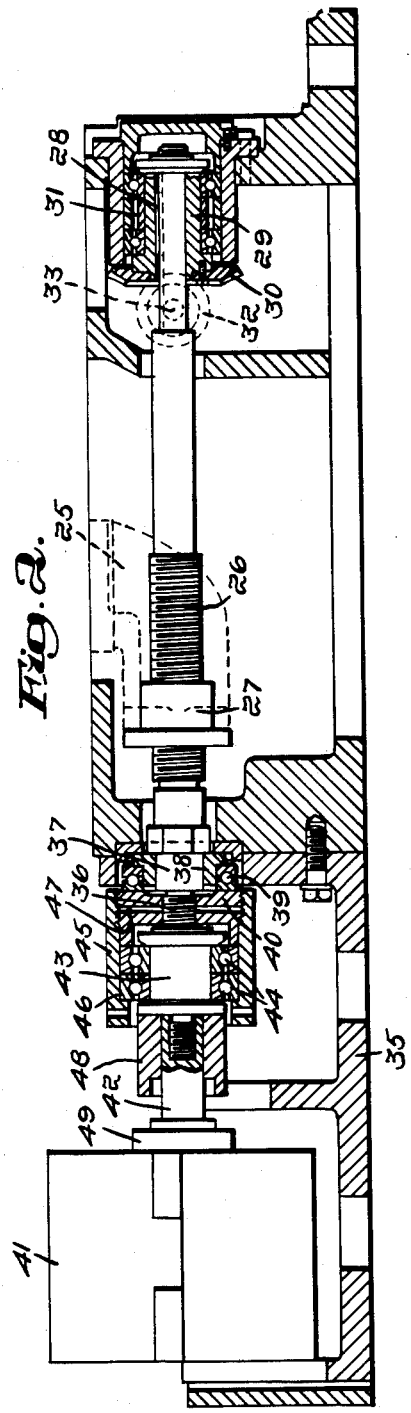
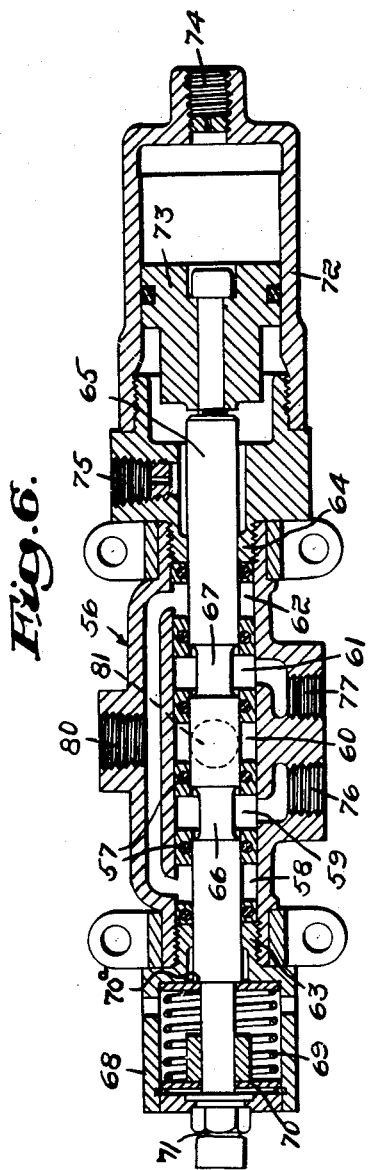

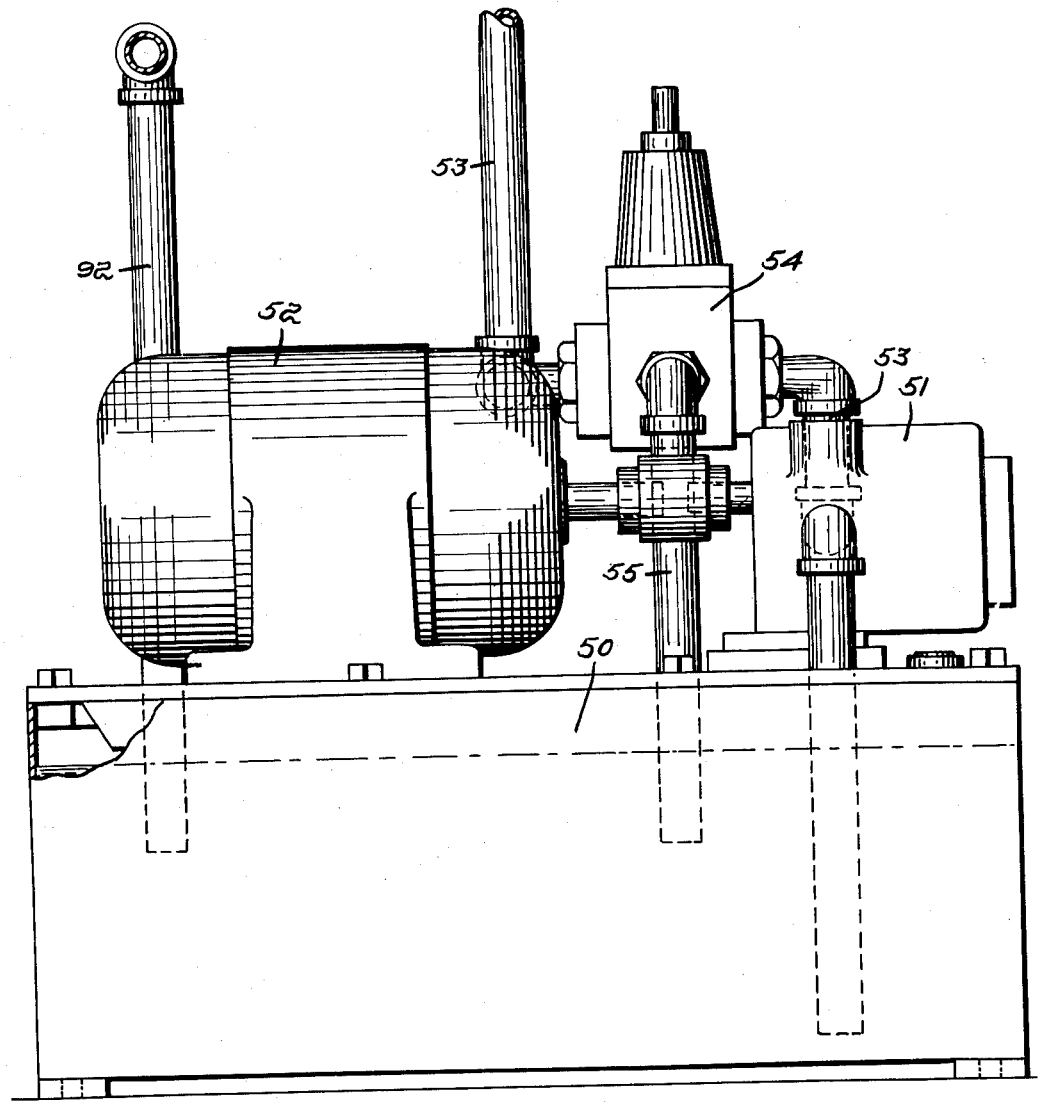

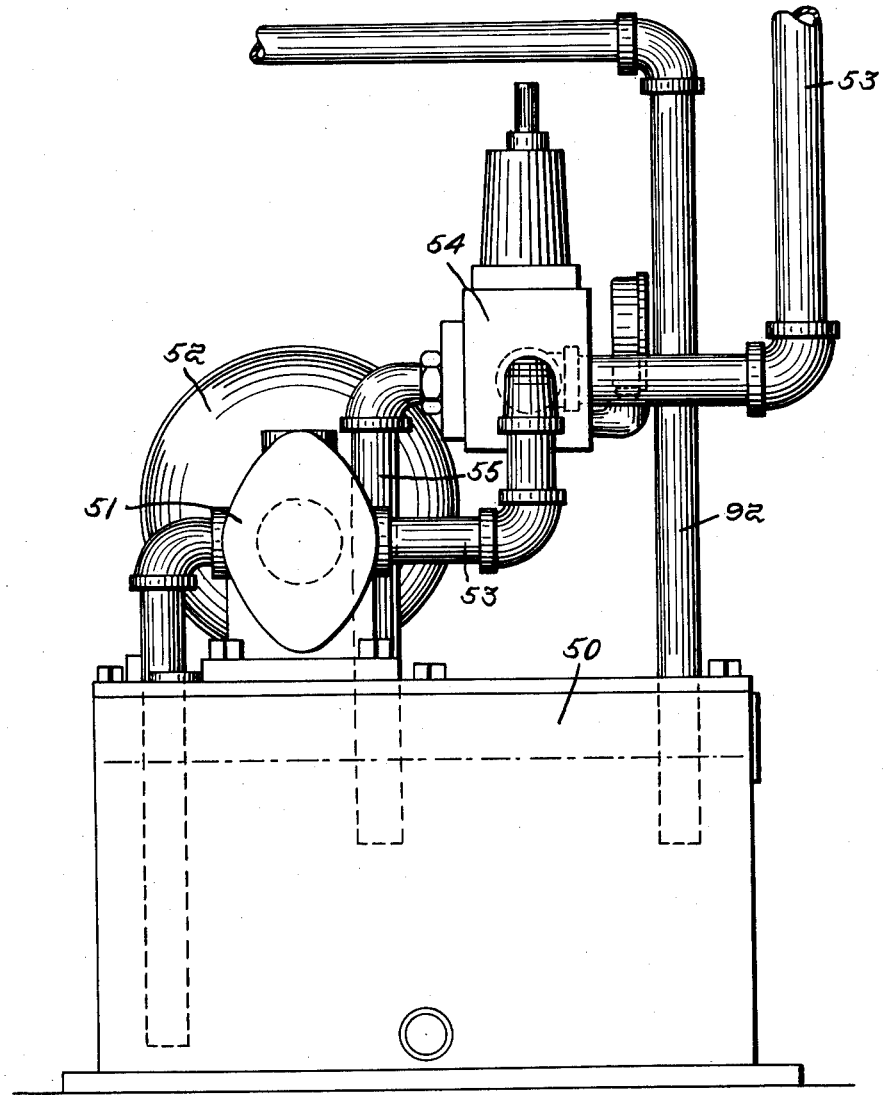

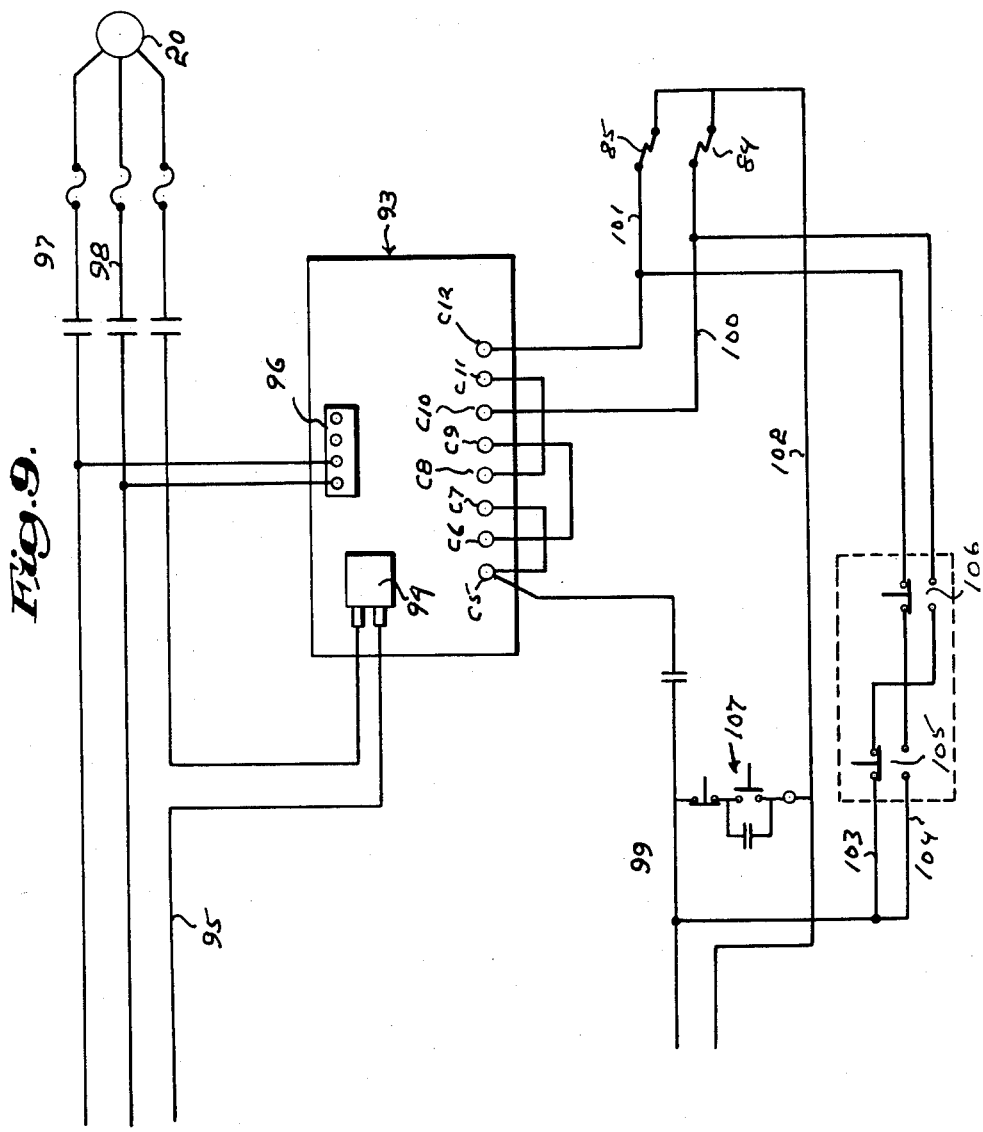

United States Patent Office 2,754,632
Patented July 17, 1956

2,754,632

PRESSURE-OPERATED CONTROL FOR CENTERLESS GRINDING MACHINES

Rufus W. Fuller, Deerfield, and Raymond A. Cole, Greenfield, Mass., assignors to Production Machine Company, Greenfield, Mass.

Application November 30, 1954, Serial No. 472,102

7 Claims. (Cl. 51—103)

This invention relates to centerless grinders and the like, and particularly to a control of the grinding action thereof that is responsive to the irregularities or contour of the work.

Centerless grinders are well adapted to finish stock by making it of uniform diameter throughout its length. It is, however, often desirable to remove only such surface imperfections as pits, scale, or scratches even though the stock is not of uniform diameter.

The general objective of this invention is to provide means to enable the grinding to follow the surface irregularities or contour of the work. This objective is attained by employing fluid pressure-operated means to move the unit by which the work is held under pressure against the grinding or contact wheel towards or away from that wheel. Such means are provided with an electrically operated control actuated in response to variations in the load of a motor, preferably that of the grinding or contact wheel drive to vary the pressure exerted on the work against the driving wheel.

The invention is readily adaptable for use with different types of centerless grinders, but more particularly and as herein illustrated to the type shown in U. S. Patents Nos. 1,421,205; 2,277,644, and 2,536,757.

In the drawings there is shown an embodiment of the invention illustrating these and other of its novel features and advantages.

Referring to the drawings:

Fig. 2 is a longitudinal section through the operating mechanism and showing the double-acting cylinder in control thereof;

Fig. 6 is a longitudinal section of the control valve;

Figs. 7 and 8 are, respectively, side and end views of the oil tank and delivery conduits, and Fig. 9 is a schematic view of the operating circuit.

Figure 1:
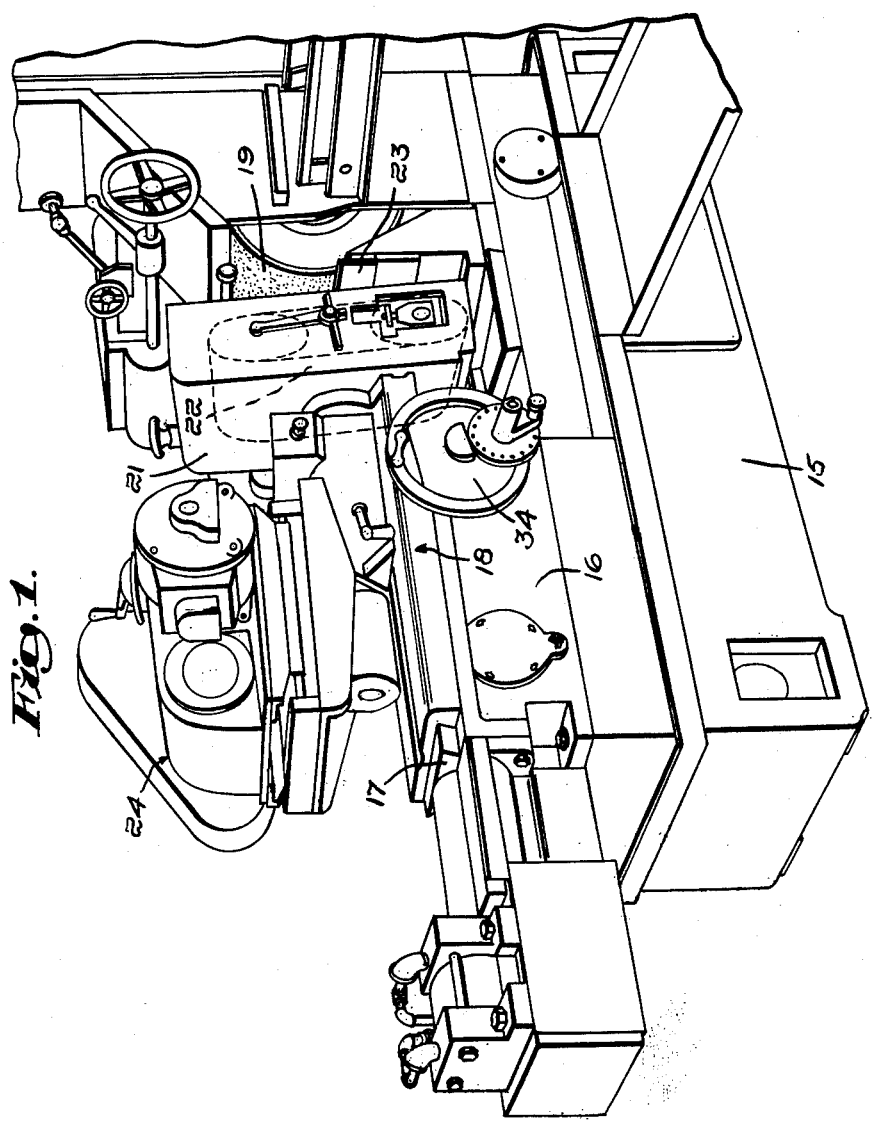
Fig. 1 is a perspective view of a centerless grinder having a belt feed unit in accordance with the invention.

In Fig. 1, there is shown the base 15 of a centerless grinder having a housing 16 provided with a way 17 slidably supporting a unit, generally indicated at 18, for movement towards or away from the contact or grinding wheel 19, whose drive motor is indicated at 20 in Fig. 9. The unit 18 has a housing 21 for the belt 22 between which and the wheel 19 there is a work support indicated at 23. The function of the belt 22, whose drive is indicated generally at 24, is that of maintaining the work against the wheel 19 under suitable pressure. For that reason, the unit 18 is herein referred to as the "pressure applying" unit.

The unit 18 has a bracket 25 (see Fig. 2) entrant of the housing 16 within which there is a rotatable screw 26 threaded through the nut 27 fixed in the bracket 25 and slidably keyed as at 28 to the hub 29 of the bevel gear 30 rotatable in the bearing unit 31 at the inner end of the housing 16. A bevel gear 32 fast on a shaft 33 (both suggested in Fig. 2) journalled in the housing 16 is rotatable by the hand wheel 34 thus to provide manually operable means for rotating the screw 26 to cause movement of the unit 18 towards or away from the grinding wheel 19.

Attached to the exposed end of the housing 16 is a support 35 into which is disposed the threaded extension 36 on the outer end of the screw 26. Inwardly of the extension 36 there is a shouldered seat 37 rotatably supporting an adapter 38 for the ball thrust bearing unit 39. The nut 40 threaded on the extension 36 is locked thereto by the pin 47 after the nut 40 has been adjusted to take up all looseness in the bearing unit 39.

A double-acting hydraulic cylinder 41 has its piston rod 42 provided with a double flanged holder 43 for the bearing units 44. The bearing units 44 are housed in a sleeve 45 against whose shoulder 46 they are held seated by screwing the sleeve 45 on the external threads of the nut 40. The piston rod 42 also carries a member 48 engageable with the stop 49 to limit the travel of the piston in one direction.

It will be apparent from the foregoing that movement of the piston rod 42 in one direction or the other causes corresponding movement of the unit 18. Because the screw 26 is slidably keyed to the bevel gear hub 29, such axial movement is not interfered with by the bevel gears 30 and 32. It will also be appreciated that rotation of the screw 26 by means of the hand wheel 34 has no effect on the piston rod and the distance of its travel defined by the distance between the stop 49 and the proximate end of the member 48 in Fig. 2, accordingly, remains constant.

The hydraulic system to the cylinder 41 includes a tank 50, see Figs. 7 and 8, provided with a pump 51 driven as by the motor 52. The delivery conduit 53 is provided with a relief valve 54 whose return 55 is in communication with said tank.

In Fig. 6 there is detailed a valve, generally indicated at 56, that has proved satisfactory. The valve 56 has a central chamber subdivided by rings 57 into spaces 58, 59, 60, 61, and 62. The central chamber is closed at each end by plugs 63 and 64 slidably supporting the valve element 65 and shown as having annular grooves 66 and 67.

The plug 63 is part of a chamber 68 in which is located the spring 69 resiliently engaging the flanged sleeve 70 slidably confined on one end of the valve element 65 as by the washer-nut lock 71. By this arrangement, the valve element 65 may move both to the right and to the left from its central position shown in Fig. 6. On movement to the left, the spring 69 is compressed by the washer-shoulder connection 70A. The plug 64 is part of a cylinder 72 for the piston 73 attached to the other end of the valve element 65. The cylinder 72 is provided with ports 74 and 75 on opposite sides of the piston 73. By this construction, the spring 69 is operative to maintain the valve element 65 yieldably in a central position from which it may be moved in either direction by the delivery of fluid under pressure to corresponding ends of the cylinder 72.

It will be noted that the valve 56 is provided with two ports 76 and 77 shown as connected by conduits 78 and 79, respectively, to opposite ends of the cylinder 41. The ports 76 and 77 are in communication with the spaces 59 and 61, respectively, and in the central position of the valve 56, the grooves 66 and 67 are exposed only in the spaces 59 and 61, respectively.

A port 80 is in communication with the spaces 58 and 62, and another port 81 is in communication with the space 60.

It will be apparent from the drawings that the grooves 66 and 67 are so dimensioned that on movement of the valve element 65, they may interconnect two adjacent spaces. In the central position of the valve element 65 shown in the drawings each space is sealed from the others. Sufficient movement of the valve element 65 against the action of the spring 69 to cause bridging of spaces 58 and 59 by the groove 66 effects the connection of ports 76 and 80. This movement also results in the groove 67 bridging the spaces 60 and 61 thus to interconnect ports 77 and 81. Corresponding movement of the valve element 65 in the opposite direction from its central position results in the interconnection of ports 77 and 80 and ports 76 and 81.

Figure 3:
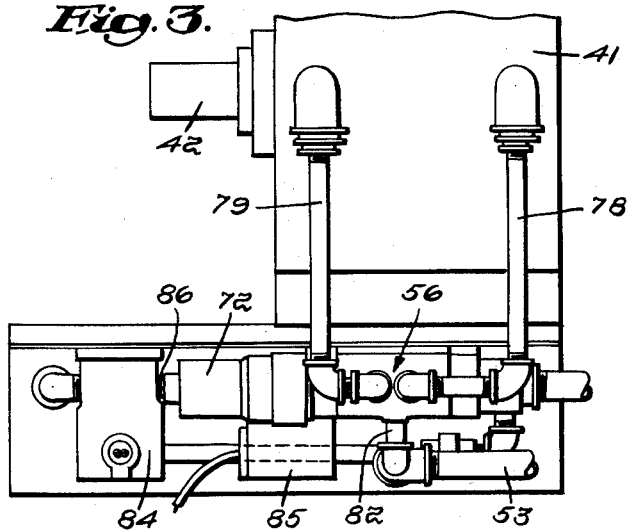
Fig. 3 is a fragmentary, top plan view of the cylinder, the control valve, and certain of the conduits.
Figure 4:
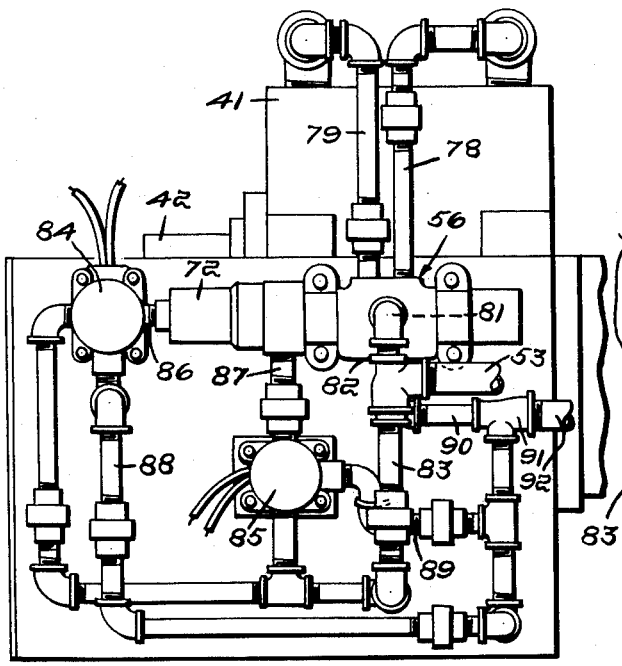
Figs. 4 and 5 are side and end views, respectively, of the subject matter of Fig. 3.
Figure 5:
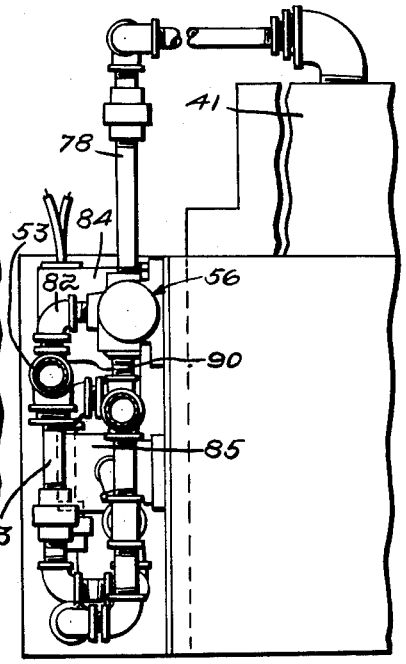

Reference is now made to Figs. 3, 4, and 5, wherein the conduit 53 is shown as having a branch conduit 82 in communication with the port 81 of the valve 56 and a branch conduit 83 in communication with the parallel solenoid-operated valves 84 and 85. The valve 84 has a conduit 86 connected to the port 74, and the valve 85 has a conduit 87 connected to the port 75. The valve 84 has a return conduit 88 joined by the return conduit 89 of the valve 85. Attached to the port 80 of the valve 56 is a return conduit 90. The return conduits are joined at 91 to the conduit 92 discharging in the tank 50.

It will thus be appreciated that the solenoid-operated valves 84 and 85 control the operation of the valve 56. These valves have a normal position in which they place the cylinder 72 in communication with the return conduits 88 and 89. When either solenoid-operated valve is energized, it places the cylinder 72 in communication with the source of oil under pressure.

From the foregoing, it will be apparent that when the solenoid of the valve 84 is energized, oil under pressure is admitted into the cylinder 72 through the port 74 to move the valve element 65 against the action of the spring 69 from the central positon. Ports 76 and 80 are thus interconnected to relieve one side of the cylinder 41; and, simultaneously, ports 81 and 77 are interconnected to effect delivery of oil under pressure to the other side of the cylinder 41 to move the pressure-applying unit 18 away from the grinding wheel 19. The valve 84 may be called the feed valve, and its solenoid, identified by the same reference numeral, is hereinafter called the feed solenoid.

With the solenoid of the valve 84 de-energized, port 74 is again connected to relief and the valve element 65 moves into its central position in response to the spring 69.

When the solenoid of the valve 85 is energized, fluid under pressure is delivered into the cylinder 72 through the port 75 thus to move the valve element 65 in the opposite direction against the action of the spring 69. On this movement, ports 77 and 80 are connected to relief, and ports 76 and 81 are interconnected, with the resultant delivery of oil to the cylinder 41, causing movement of the pressure-applying unit towards the grinding wheel 19. The valve 85 may be called the retracting valve and its solenoid, identified by the same reference numeral, is hereinafter called the retracting solenoid.

In accordance with the invention, the feeding and the retracting solenoids 84 and 85, respectively, are energized in response to requirements of the work being ground thus to deliver oil to the side of the hydraulic cylinder 41 that is necessary to maintain desired grinding pressure to ensure uniform grinding action in spite of the irregularities in the contour of the work. This result may be effectively attained by means of the control circuit schematically shown in Fig. 9.

In order to attain this result, an electronic motor load control, generally indicated at 93, is employed. The control 93 has its current transformer 94 in the lead 95 to the motor 20 and its potential transformer 96 between the motor lead 97 and the ground 98.

The operating circuit 99 leads to the control 93 having a series of contacts designated, for convenience, as C5, C6, C7, C8 C9, C10, C11, and C12. The contact C10 includes the lead 100 to the feed solenoid 84, and the contact C12 is for the lead 101 to the retracting solenoid 85. The leads 100 and 101 join the ground 102.

In the operation of the control 93, a decrease in the motor load results in the circuit being closed between the contacts C5 and C6 and also between the contacts C9 and C10. On an increase in motor load, the control 93 is operative to close the circuit between contacts C7 and C8 and also between C11 and C12.

While this basis of operation enables the contour of the work to be accurately followed, manual control of the circuit 99 is also provided. The circuit 99 has parallel leads 103 and 104 connected directly to the leads 100 and 101, respectively, and these are provided with normally open manually-operated switches 105 and 106, respectively. These switches control both leads so that the closing of only one of them at a time is possible. A connector, generally indicated at 107, is provided to render the control 93 operative or inoperative.

From the foregoing, it will be apparent that the invention is well adapted to meet a wide variety of grinding requirements since it enables a centerless grinder to operate in a conventional manner with a manual control of fluid pressure-operated, pressure-adjusting means, or with automatic control of these means to effect contour grinding.

While we have described the herein preferred embodiment of our invention as applied to a grinding wheel and with the pressure-responsive unit movable to and from the grinder, it will be appreciated that we may reverse such construction and move the grinding element toward and from the work-feeding instrumentalities, and also that the grinding device may be a polishing element, and that the grinding element may be either a wheel or belt.

We claim:

1. In a centerless grinder, a contact wheel, a drive for said wheel including a drive motor, a unit including a belt and a drive motor therefor, a work support between said unit and said wheel, said unit being movable toward and away from said wheel thus to hold the work against said wheel under pressure exerted by said belt, means operable to move said unit in either of said directions and including a first double-acting cylinder, a liquid delivery system including a supply source, a four-way valve with two conduits, one for each direction of travel and in communication with opposite ends of said cylinder, and a second double-acting cylinder operatively connected to said valve, and first and second two-way valves, all valves being operatively connected to said source and including reliefs, each of said two-way valves being in communication with opposite ends of said second cylinder, and a control responsive to the load on one of said motors and operatively connected to said two-way valves to operate them in the alternative to maintain the pressure on the work approximately constant.

2. In a centerless grinder, a contact wheel, a drive for said wheel including a drive motor, a unit including a belt and a drive motor therefor, a work support between said unit and said wheel, said unit being movable towards and away from said wheel thus to hold the work against said wheel under pressure exerted by said belt, means operable to move said unit in either of said directions and including a first double-acting cylinder, a liquid delivery system including a source of supply, a four-way valve with two conduits, one for each direction of travel and in communication with opposite ends of said cylinder, and a second double-acting cylinder operatively connected to said valve, first and second two-way valves, all valves being operatively connected to said source and including reliefs, each of said two-way valves being in communication with opposite ends of said second cylinder, and means to operate said two-way valves.

3. In a centerless grinder, a contact wheel, a drive for said wheel including a drive motor, a unit including a belt and a drive motor therefor, a work support between said unit and said wheel, said unit being movable towards and away from said wheel thus to hold the work against said wheel under pressure exerted by said belt, means operable to move said unit in either of said directions and including a first double-acting cylinder, a liquid delivery system including a source of supply, a four-way valve with two conduits, one for each direction of travel and in communication with opposite ends of said cylinder, and a second double-acting cylinder operatively connected to said valve, first and second two-way valves, all valves being operatively connected to said source and including reliefs, each of said two-way valves being in communication with opposite ends of said second cylinder and including a solenoid which when energized delivers liquid to the second cylinder, and which when de-energized connects said second cylinder to relief, and an operating circuit to each of said solenoids, and including switch means, the switch means of each circuit being operative when closed to open the other circuit.

4. In a centerless grinder, a contact wheel, a drive for said wheel including a drive motor, a unit including a belt and a drive motor therefor, a work support between said unit and said wheel, said unit being movable toward and away from said wheel thus to hold the work against said wheel under pressure exerted by said belt, means operable to move said unit in either of said directions and including a first double-acting cylinder, a liquid delivery system including a source of supply, a four-way valve with two conduits, one for each direction of travel and in communication with opposite ends of said cylinder, and a second double-acting cylinder operatively connected to said valve, first and second two-way valves, all valves being operatively connected to said source and including reliefs, each of said two-way valves being in communication with opposite ends of said second cylinder and including a solenoid which when energized deliver liquid to the second cylinder, and which when de-energized connect said second cylinder to relief, and an operating circuit to each of said solenoids, one of said motors including a circuit provided with a load control, said load control closing said operating circuits.

5. In a centerless grinder, a contact wheel, a drive for said wheel including a drive motor, a unit including a belt and a drive motor therefor, a work support between said unit and said wheel, said unit being movable toward and away from said wheel thus to hold the work against said wheel under pressure exerted by said belt, fluid pressure-operated means operable to move said unit in either of said directions and including delivery valve means having feeding, retracting, and neutral positions, operating valve means including a double acting cylinder operatively connected to said delivery valve means and having a neutral position and an operative position for each direction of unit movement, a control responsive to the load on one of said motors and operatively connected to said operating valve means to effect an appropriate one of said operative positions until the pressure on the work reaches a predetermined value and yieldable means normally maintaining said delivery and operating valve means in their neutral positions.

6. In a centerless grinder, a contact wheel, a drive for said wheel including a drive motor, a unit including a belt and a drive motor therefor, a work support between said unit and said wheel, said unit being movable toward and away from said wheel thus to hold the work against said wheel under pressure exerted by said belt, fluid pressure-operated means operable to move said unit in either of said directions and including delivery valve means having feeding, retracting, and neutral positions operating valve means including a double-acting cylinder operatively connected to said delivery valve means having a neutral position and an operative position for each direction of unit movement and first and second valves, one for each direction of unit movement, a source of fluid under pressure, delivery and relief systems effecting communication between said source and said fluid pressure-operated means and said valve-operating means and its valve, a control responsive to the load on one of said motors and including a feed solenoid and a retracting solenoid operatively connected to respective ones of said valve to operate them as required to maintain the pressure on the work approximately constant, and yieldable means normally maintaining said delivery and operating valve means in said neutral positions.

7. In a centerless grinder, a contact wheel, a drive for said wheel including a drive motor, a unit including a belt and a drive motor therefor, a work support between said unit and said wheel, said unit being movable toward and away from said wheel thus to hold the work against said wheel under pressure exerted by said belt, a source of liquid under pressure, pressure-operated means operable to move said unit in either of said directions, a liquid delivery system effecting communication between said source and said means and including delivery valve means having a neutral position and movable therefrom into delivery and relief positions effecting unit movement in either of said directions, operating valve means in communication with said source and including a double-acting cylinder operatively connected to said delivery valve means, said operating valve means having a neutral position and a position for each direction of unit movement, a control responsive to the load on one of said motors and operatively connected to said operating valve means to effect said positions as required to vary the pressure on the work in relation to a predetermined work pressure, and a spring common to said delivery valve means and said double-acting cylinder and positioning them whenever said predetermined work pressure is attained.

References Cited in the file of this patent

UNITED STATES PATENTS

| | | |
|---|---|---|
| 1,442,041 | Boddie | Jan. 16, 1923 |
| 1,985,433 | Turner | Dec. 25, 1934 |
| 1,993,830 | Conover | Mar. 12, 1935 |
| 1,996,465 | Ernst | Apr. 2, 1935 |
| 2,033,335 | Haas et al. | Mar. 10, 1936 |
| 2,048,467 | Roehm | July 21, 1936 |
| 2,277,644 | Howe | Mar. 24, 1942 |
| 2,295,342 | Graf et al. | Sept. 8, 1942 |
| 2,590,102 | Hopkins | Mar. 25, 1952 |

FOREIGN PATENTS

| | | |
|---|---|---|
| 363,544 | Great Britain | Dec. 24, 1931 |